United States Patent [19]
Bielaga

[11] Patent Number: 5,901,678
[45] Date of Patent: May 11, 1999

[54] GUIDED PISTON FOR INTERNAL COMBUSTION ENGINE

[75] Inventor: Steven C. Bielaga, Naperville, Ill.

[73] Assignee: Navistar International Transportation Corp, Chicago, Ill.

[21] Appl. No.: 08/967,480

[22] Filed: Nov. 11, 1997

[51] Int. Cl.$^6$ ........................................................ F16J 1/04
[52] U.S. Cl. ............................................. 123/193.6; 92/227
[58] Field of Search ................................ 123/193.6, 193.4; 92/227, 228, 229, 230, 211, 214, 225

[56] References Cited

U.S. PATENT DOCUMENTS

| | | | |
|---|---|---|---|
| 1,475,520 | 11/1923 | Sorel | 92/227 |
| 1,506,253 | 8/1924 | Pondelick | 92/227 |
| 1,555,606 | 9/1925 | Pondelick | 92/227 |
| 1,769,020 | 7/1930 | Flammang | 92/227 |
| 4,677,900 | 7/1987 | Philby . | |
| 5,245,913 | 9/1993 | Kato | 123/193.6 |
| 5,251,540 | 10/1993 | Rhodes et al. . | |

*Primary Examiner*—Marguerite McMahon
*Attorney, Agent, or Firm*—Dennis Kelly Sullivan

[57] ABSTRACT

A guide ring for a piston comprises a split ring member having end edges which can be spread apart to slip the guide over the piston head and into a circumferential groove on an outer surface of a skirt portion of the piston head with the portions of the guide ring located in the pin bore area, including the end edges, being flattened. The guide ring is axially elongated and overlaps the piston pin bores. The guide ring is formed of low friction polyimide material which is firm yet flexible, compressible, and returns to its preformed configuration when the end edges are released.

12 Claims, 2 Drawing Sheets

GUIDED PISTON FOR INTERNAL COMBUSTION ENGINE

BACKGROUND OF THE INVENTION

The present invention relates to a piston for an internal combustion engine which includes a circumferential guide ring insert set within a groove in an outer surface of a skirt of the piston.

PRIOR ART

Heretofore, various embodiments of piston guide structures have been proposed for use on a skirt of a piston for guiding the piston within the engine cylinder as well as for preventing metal-to-metal contact between the piston outer surface and the inner wall of the cylinder and decreasing parasitic frictional forces, inherently leading to the enhancement of usable engine power.

Several embodiments of such piston inserts have been proposed. For example, U.S. Pat. No. 5,251,540 discloses a piston skirt having apertures therein. An insert of a plastic type material is injection molded into the aperture and extends radially outwardly of a periphery of the piston skirt.

Also, U.S. Pat. No. 4,677,900 discloses a plurality of plastic strips which are contained in separate recesses formed in the piston skirt wall, the strips extending just above the skirt surface and being hydrodynamically lubricated by a lubricant film in the area between the piston and the cylinder.

The embodiments described above are not only time consuming to create but are also complex to deal with during positioning of the piston within the cylinder.

SUMMARY OF THE INVENTION

Accordingly, it is a primary object of the invention to provide a piston including a guide ring on a skirt thereof, the guide ring being easily manufactured and easily accommodated by the piston skirt, the embodiment disclosed providing time and labor saving over the embodiments heretofore available.

More specifically, there is provided a piston assembly for an internal combustion engine wherein an axially elongated groove is positioned in the skirt of the piston, the groove intersecting the pin bore areas of the skirt. A low friction polymeric guide ring is disposed in the groove and extends slightly beyond the skirt to engage the cylinder wall during operation, thereby reducing the frictional losses in the engine. The guide ring is split to permit feeding it over the bottom or top of the piston to engage the groove and has radially inset flattened portions which engage the pin bore areas of the skirt and prevent the ends of the ring from engaging the cylinder.

BRIEF DESCRIPTION OF THE DRAWINGS

Other objects and advantages of the invention will become more apparent upon perusal of the detailed description thereof and upon inspection of the drawings in which.

DESCRIPTION OF THE PREFERRED EMBODIMENT

Figure 1:
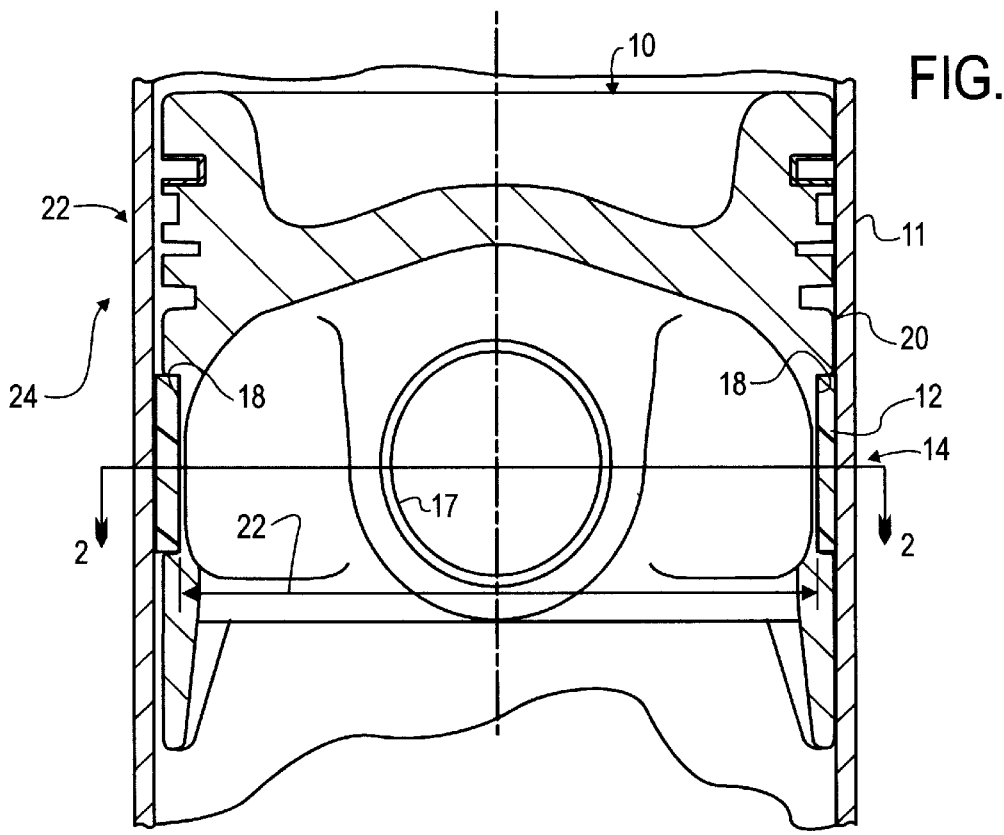
FIG. 1 is a sectional elevation of a piston disposed within an engine cylinder showing a circumferential groove within a skirt portion thereof within which the guide ring seats.
Figure 2:
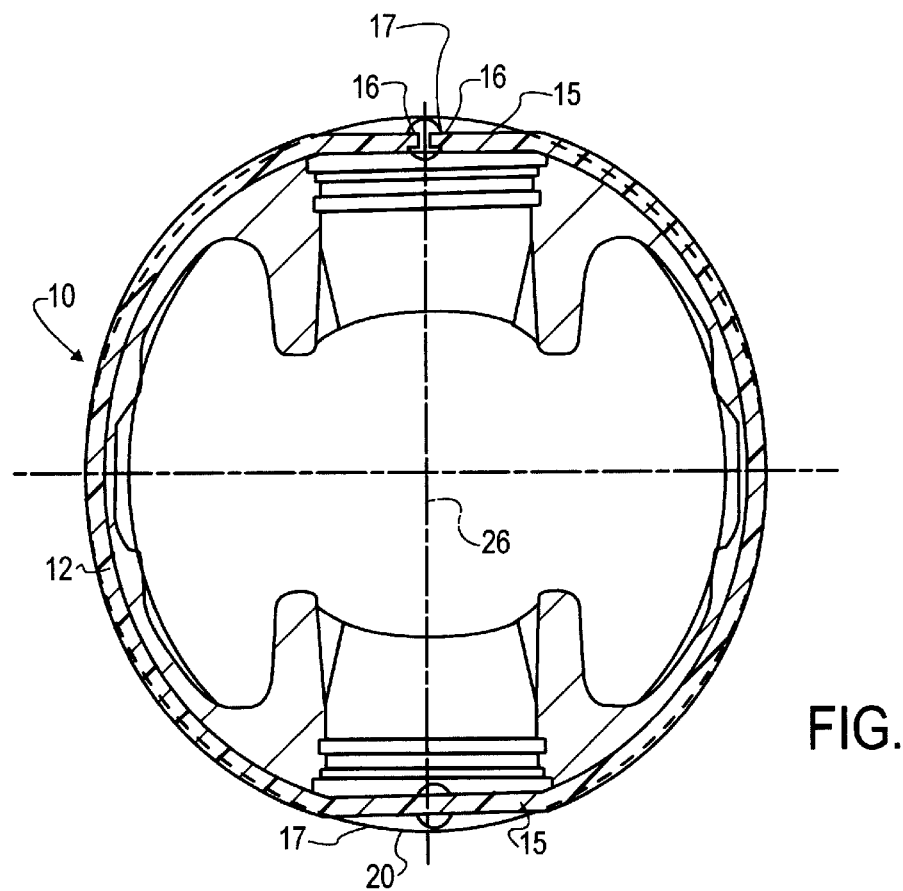
FIG. 2 is sectional plan view through the piston skirt showing the guide ring disposed thereabout within the groove provided for same, the section being taken along line 2—2 of FIG. 1.
Figure 3:
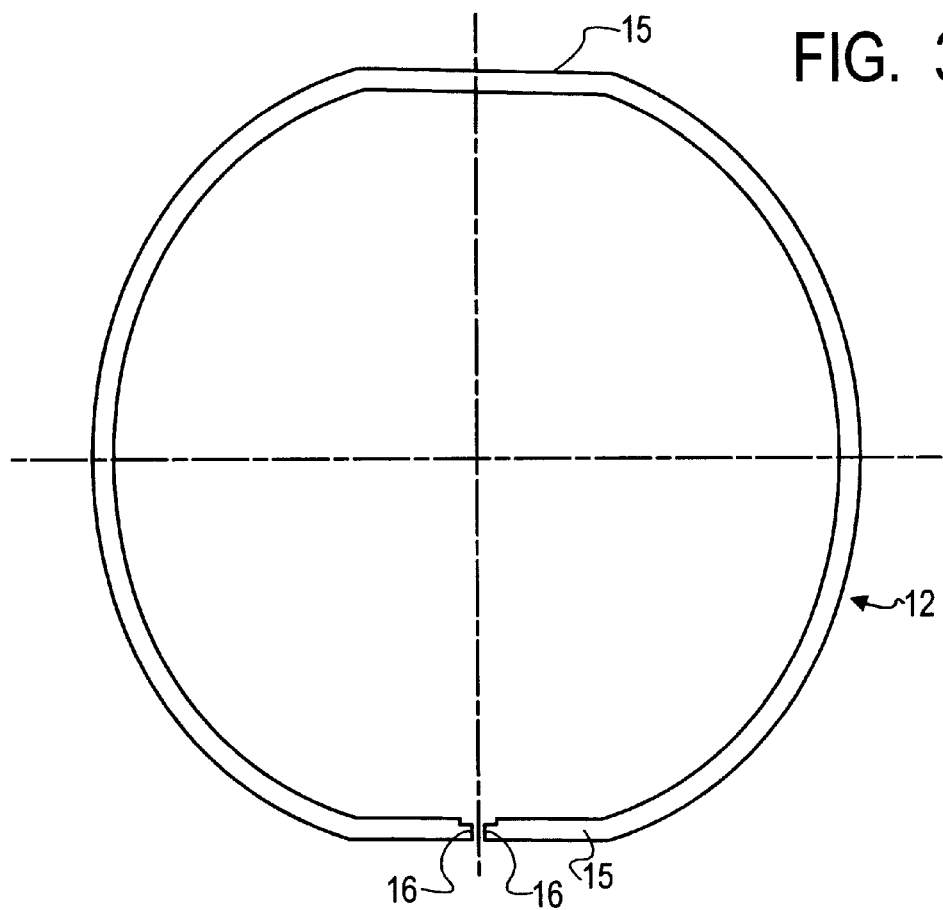
FIG. 3 is a plan view of the guide ring of the present invention.
Figure 4:
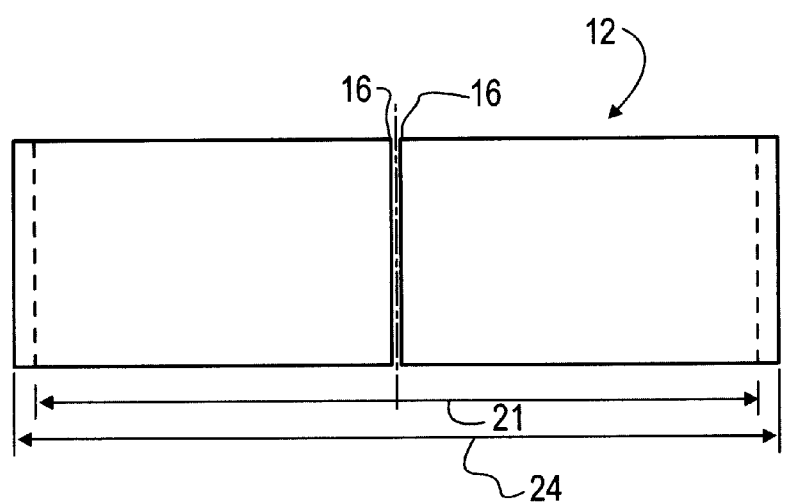
FIG. 4 is a side view of the guide ring of FIG. 3.

Referring now to the drawings in greater detail, there is illustrated in the drawings a piston 10 disposed within a cylinder 11 of an internal combustion engine and incorporating a split guide ring 12 engaged to a skirt 14 of the piston 10 in accordance with the teachings of the present invention. The piston further has pin bores 17 which receive a piston pin (not shown) for connecting the piston to a connecting rod (not shown) in a conventional manner.

As illustrated, the piston guide ring 12 has an inner diameter which is less than the diameter of the piston skirt 14 and a rectangular cross-section which is radially thin and axially elongated. Although the major portion of the ring is circular to conform to the engine cylinder wall along the thrust and anti-thrust surfaces disposed 90° to the pin bores 17, the ring 12 periphery has two diametrically-opposite flattened areas 15, and is split in one flattened area 15 to provide two adjacent end edges 16. The guide 12 is made from a temperature resistant (at least to about 300° F.), graphite-filled, low friction polymer material, such as Poly-N-N'-(P, P'-oxydiphenylene) pyro-mellitimide, having sufficient elasticity and shape memory such that, when the end edges 16 are moved away from one another during engagement of the guide ring 12 onto the skirt 14 of the piston 10, and the expansion force is released, the guide ring 12 snaps back to its preformed molded configuration. The decreased friction resulting from the use of the low friction polymer material will reduce the parasitic load and inherently increase the usable power from the engine incorporating the piston 10. A preferred material is VESPEL® SP-21 Polyimide manufactured by DuPont.

The guide ring 12 is positioned within a circumferential groove 18 formed in an outer surface 20 of the skirt 14 of the piston 10 so that the flattened portions 15 are disposed in the pin bore areas 17 of the skirt 14 which are radially inset from the cylinder wall 11. Thus, the end edges 16 of the guide ring 12 are not in contact with the cylinder wall.

It will be understood that the piston 10 is usually provided with a plurality of grooves 22 along an upper circumferential area 24 for receipt of piston rings (not shown) therein. Creation of the groove 18 in the skirt 14 for receipt of the guide ring 12 therein may be easily accomplished using a similar device to that which creates the piston ring grooves 22.

Further, by providing the guide 12 as a split ring which extends substantially about the skirt 14, there is no need for cutting holes through the full thickness of the skirt 14, nor is there a need for labor intensive methods, such as extruding guides of particular configuration into holes, etc.

During installation, since the guide ring 12 overlaps the piston pin bores, the piston will first be attached to a connecting rod (not shown) by a piston pin (not shown) in the conventional manner. Then, since the guide ring 12 is manufactured from a flexible material, an assembler merely flexes the end edges 16 away from each other to a sufficient degree to allow the guide ring 12 to slip over the skirt 14 and seat within the groove 18 with the flattened portions 15 of the guide ring 12 being located adjacent the piston pin bores 17. When the guide ring 12 is aligned in the groove 18 and pressure holding the end edges 16 apart is released, the guide 12 snaps back to its performed shape, seating itself tightly into the groove 18.

It will be understood that an inner periphery (shown at 21) of the guide ring 12 will be nearly equal to, or slightly less than an inner periphery (shown at 22) of the groove 18 so as to securely engage therein.

It will also be understood that, except in the pin bore areas 17, the outer periphery (shown at 24) of guide ring 12 will extend slightly outwardly of the outer periphery (shown at 26) of the skirt 14, to prevent contact between the outer surface 20 of the skirt 14 and its surrounding inner cylinder surface 11. The guide ring 12 will be compressed to a degree when it is pressed into the engine cylinder which will secure engagement of the guide ring 12 within the groove 18 so that the guide ring 12 cannot unseat during reciprocating motion of the piston 10.

As described above, the guide 12 of the present invention provides a number of advantages, some of which have been described above and others of which are inherent in the invention. Also modifications may be proposed without departing from the teachings herein. Accordingly the scope of the invention is only to be limited as necessitated by the accompanying claims.

What is claimed is:

1. A piston assembly comprising a piston having a head and a skirt, said skirt having a groove disposed in an outer circumference thereof, and a guide ring for spacing said skirt away from a cylinder within which the piston reciprocates, said guide comprising a split ring of low friction polymeric material having an axially elongated wall section, said guide ring being seated within said groove and having a portion extending from said groove to an outer periphery preventing contact of said skirt with said cylinder.

2. The piston assembly of claim 1 wherein said ring includes a periphery having a flat portion and said piston includes a pin bore area, said flat portion being disposed within said pin bore area.

3. The piston assembly of claim 1 wherein said ring periphery having two diametrically opposed flat portions, said flat portions being disposed within said pin bore areas.

4. The piston assembly of claim 1 wherein said ring is made of a flexible graphite-filled, temperature-resistant polymer material having a shape memory.

5. The piston assembly of claim 1 wherein said ring has an inner diameter approximately equal to an inner diameter of the groove in the piston skirt.

6. The piston assembly of claim 1 wherein said ring has an outer diameter greater than an outer diameter of the piston skirt.

7. The piston assembly of claim 1 wherein said ring overlaps said piston pin bores.

8. A guide ring for an internal combustion engine piston adapted to operate in an engine cylinder comprising a ring of polymeric material of rectangular cross-section having an axially elongated outer periphery including a major portion thereof conforming to said cylinder, said ring being split to define ends of said ring, having a radially inset flat portion adjacent the ring ends.

9. The guide ring of claim 8 and said ring having a second radially inset flat portion disposed diametrically opposite said split.

10. A method for manufacturing a piston assembly, including a piston with a head and a skirt, the method including the steps of:

machining a groove of predefined dimension around the circumference of the piston skirt;

molding a split ring of predefined dimensions from a low friction polyimide material having a memory for the molded configuration, said split ring defining opposed end edges;

flexing the two end edges away from each other;

sliding the ring over the piston skirt into a position overlying the groove;

releasing the end edges to allow the ring to engage within the groove; and fitting the piston skirt with attached guide ring into an engine cylinder, the guide ring spacing the skirt from the cylinder a predetermined distance.

11. The method in accordance with claim 10 wherein said piston is provided with pin bores further comprising overlapping said pin bores with said split ring.

12. The method in accordance with claim 10 including the initial step of inserting a piston pin in said pin bore.

* * * * *